3,251,787
PREPARATION OF POLYURETHANE FOAMS FROM NITROGEN-CONTAINING POLYOLS
William C. Bedoit, Jr., Houston, Tex., assignor to Jefferson Chemical Company, Inc., Houston, Tex., a corporation of Delaware
No Drawing. Original application July 16, 1962, Ser. No. 210,223, now Patent No. 3,201,400, dated Aug. 17, 1965. Divided and this application Jan. 22, 1965, Ser. No. 427,468
3 Claims. (Cl. 260—2.5)

This application is a division of copending Bedoit application, Serial No. 210,223, filed July 16, 1962, and entitled "Propylene Oxide Adducts of 1-{2-[Bis(2-Hydroxypropyl)Amino]Ethyl} - 4-(2-Hydroxypropyl)Piperazine," now United States Patent No. 3,201,400.

This invention relates to novel propylene oxide adducts and to a method for the preparation of such adducts. This invention also relates to a method for the preparation of flexible foam polyurethanes from such products.

In copending Currier et al. application Serial No. 210,222, filed July 16, 1962, and entitled "New Compound and Method for Preparing Polyurethane Therefrom," there is disclosed a method for the preparation of 1-{2[bis(2-hydroxypropyl)amino]ethyl} - 4 - (2 - hydroxypropyl)-piperazine, hereinafter referred to as propoxylated N-aminoethylpiperazine.

It has been discovered in accordance with the present invention that good quality propylene oxide adducts of propoxylated N-aminoethylpiperazine in the 400–7000 molecular weight range (calculated from hydroxyl number can be prepared when (a) the propoxylated N-aminoethylpiperazine is reacted with propylene oxide under basic reaction conditions to provide a basic crude reaction product, (b) the crude reaction product is neutralized with a theoretical amount of oxalic acid, and (c) the crude reaction product is filtered to provide a good quality higher molecular weight propylene oxide adduct. By following this procedure, a low ash product of good color and odor is obtained having the formula:

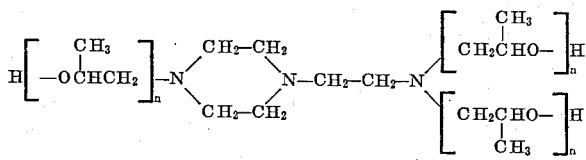

wherein $n$ is a positive integer within the range from 2 to about 40. The thus-prepared propylene oxide adducts of the above formula are useful for a variety of purposes, including the preparation of polyurethanes.

A particularly desirable class of propylene oxide adducts is the class wherein $n$ in the above formula is within the range of about 15 to 25. These adducts can be reacted with an organic isocyanate in the presence of a tertiary amine catalyst stabilizer and a blowing agent to provide excellent quality low density, low odor polyurethane foams having good flex fatigue qualities.

The starting materials for the preparation of the adducts are propylene oxide, propoxylated N-aminoethylpiperazine and an appropriate base, such as alkali metal or alkaline earth metal hydroxide. A preferred base is potassium hydroxide.

A propoxylated adducts is prepared by charging propoxylated N-aminoethylpiperazine and 0.1 to 5 wt. percent of a base such as potassium hydroxide to an appropriate reaction vessel, such as an autoclave provided with an agitator and a vacuum source. After the autoclave has been purged of air (e.g., by vacuum evacuation or purged with an inert gas such as nitrogen), a desired amount of propylene oxide is added to the autoclave batchwise or incrementally under reaction conditions including a pressure of 30 to 60 p.s.i.g. and a temperature of 110° to 150° C. for a period of time within the range of about 0.5 to about 10 hours. Thereafter, the pressure is released and oxalic acid is added in an amount equivalent to the amount of base initially employed. Neutralization is conveniently accomplished at a temperature within the range of about 110° to about 150° C. with agitation over a period of time of about 15 minutes to about two hours, after which the reaction product is filtered to remove insoluble oxalates and to provide a desired product having the formula given above.

If less than an equivalent amount of oxalic acid is employed, incomplete neutralization will result, whereas the use of excess oxalic acid will result in the formation of amine oxalate salts which will cause discoloration of the product.

The thus-prepared propylene oxide adducts may be used alone or in admixture with other polyethers or hydroxy terminated polyesters to provide polyurethane foams by reaction with an organic polyisocyanate and water in the presence, if desired, of an appropriate catalyst, such as a tertiary amine or a mixture of a tertiary amine with an organotin compound. It is normally desirable to utilize a foam stabilizer, such as a silicone oil.

It has been surprisingly discovered that low odor, low density, flexible polyurethane foams having excellent flex fatigue properties can be prepared when an organic diisocyanate is reacted, in the presence of an appropriate catalyst and foam stabilizing agent, with a member of a preferred class of propylene oxide adducts having the following formula:

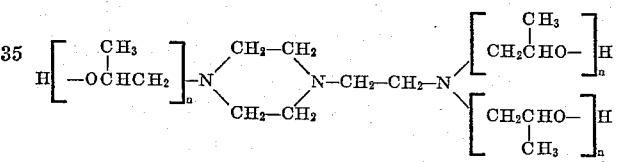

wherein $n$ is a positive integer having a value from about 15 to about 25.

Any suitable organic diisocyanate may be used, such as, for example, trimethylene diisocyanate, hexamethylene diisocyanate, meta-xylylene-1,3-diisocyanate, cyclohexylene-1,4-diisocyanate, dicyclohexylmethane - 4,4'-diisocyanate, meta-phenylene dissocyanate, para-phenylene diisocyanate, 2,4-tolylene diisocyanate, 2,6-tolylene diisocyanate, 2,6 - diethylbenzene - 1,4 - diisocyanate, diphenylmethane - 4,4' - diisocyanate, 3,3' - dimethoxy-diphenylmethane - 4,4' - diisocyanate, naphthalene - 1,5-diisocyanate, etc., or mixtures of two or more of such diisocyanates.

The catalytic agent to be employed may suitably comprise a tertiary amine, such as trimethylamine, triethylamine, N-ethylmorpholine, N,N'-dimethylpiperazine, triethylenediamine, pentamethyldiethylenetriamine, etc. The tertiary amine may be used alone or in admixture with a suitable organotin compound, such as dibutyltin dilaurate, stannous octoate, stannous oleate, dibutyltin di-2-ethylhexoate, etc.

The above ingredients are reacted with a triol composition comprising a propylene oxide adduct of the above mentioned formula.

For example, the triol component may consist of a member of the preferred class of propylene oxide adducts of the present invention. Alternatively, from about 5 to about 95 wt. percent of the propylene oxide adduct of the present invention may be replaced with one or a plurality of triols, or with a mixture of diols with triols or tetrol, or both, to provide a mixture having an average functionality of about 3. Thus, the other hydroxyl component may be selected from the group consisting of hydroxy-terminated polyesters and polyoxypropylene ethers of polyhydric alcohols, hydroxy-terminated polyester amides, polythiol ethers, etc., and mixtures thereof. Such triol component should have a molecular weight of at least about 500 and will desirably have a molecular weight within the range of about 1,000 to about 7,000. Best results are obtained with polyols having molecular weights within the range of about 2,000 to about 4,000. Representative examples of such materials include, for example, propylene oxide adducts of polyols, such as ethylene glycol, 1,3-propylene glycol, 1,4-butylene glycol, 1,5-amylene glycol, trimethylol propane, glycerine, pentaerythritol, etc., and mixtures thereof. The hydroxy-terminated polyesters may be prepared by the reaction of a suitable dihydric alcohol with carboxylic acid, such as adipic acid, glutaric acid, succinic acid, maleic acid, oxalic acid, phthalic acid, sebacic acid, etc., or mixtures thereof.

The foam stabilizer to be utilized in accordance with the present invention may suitably be a silicone such as dimethyl polysiloxone or silicone-polyglycol copolymers, or stabilizers such as polyethoxylated vegetable oils, polyethoxylated phenols, etc.

The blowing agent for use in the preparation of the foam may suitably be any compound, such as water, dichlorodifluoromethane, trifluoromethane, etc.

The above named ingredients may be employed in the relative ratio, based on 100 parts of the triol component, of 30 to 40 parts of isocyanate, 0.2 to 0.8 part of tertiary amine (e.g., triethylenediamine), 0 to 0.4 part of organo-tin compound, 2 to 4 parts of blowing agent (e.g., water) and 0.4 to 2 parts of foam stabilizing agent.

The foam may be produced by a so-called one-shot method employing a suitable mixing apparatus such as that disclosed and described in Hoppe et al. U.S. Patent No. 3,005,624.

The invention will be further illustrated in connection with the following specific examples, which are given by way of illustration and not as limitations on the scope of this invention.

EXAMPLE I

Twenty-six and three tenths pounds of propoxylated N-aminoethylpiperazine and 24 grams of potassium hydroxide were added to a stirred autoclave. Air was removed by flushing the reactor with nitrogen. The mixture was stirred and heated at 110° C. for about 15 minutes, and thereafter propylene oxide was pressured into the kettle until 9.7 pounds of propylene oxide had been added at a temperature of 110° C. and a maximum pressure of 60 p.s.i.g. The product was digested with agitation at 110° C. for an additional two hours. Pressure was then released through a cold trap to condense volatile products and the crude reaction product was neutralized at 110° C. with 27 grams of oxalic acid dihydrate and then vacuum stripped at 120° C. to remove volatile components. The product was filtered and cooled and was found to have the following properties:

*Table 1*

| | |
|---|---:|
| Hydroxyl number | 437 |
| Color, Gardner | 5.5 |
| pH (1 wt. percent aqueous solution) | 11 |
| Ash, wt. percent | Nil |

EXAMPLE II

According to the process in Example I, a propylene oxide adduct of propoxylated N-aminoethylpiperazine of 2,850 molecular weight (hydroxyl number 59) was prepared. Charges for the reaction were as follows: propoxylated N-aminoethylpiperazine (6 lb.), potassium hydroxide (96 g.) propylene oxide (62 lb.). The product had the following physical properties:

| | |
|---|---:|
| Hydroxy No. neg. KOH/g. | 59 |
| Water, wt. percent | 0.03 |
| Ash, wt. percent | Nil |
| Viscosity, 100° F. cs | 265 |
| Color, Gardner | 2–3 |

EXAMPLE III

In another series of experiments, the same reaction conditions were employed to prepare a series of adducts which were then neutralized with varying quantities of oxalic acid. The neutralization procedure employed and the results obtained are set forth in the following table:

*Table 2.—Acid required for neutralization of aminoethylpiperazine-propylene oxide adducts*

[AEP-PrO Adduct mol. wt. 3,000] [1]

| Sample Number | 1 | 2 | 3 | 4 | 5 | 6 |
|---|---|---|---|---|---|---|
| Potassium hydroxide, g | 5.65 | 5.65 | 5.65 | 5.65 | 5.65 | 5.65 |
| Oxalic acid dihydrate, g | 4.24 | 5.78 | 6.36 | 6.94 | 7.51 | 8.10 |
| Oxalic acid percent excess | None | None | Theory | 10 | 18 | 28 |
| Oxalic acid potassium hydroxide wt. ratio | 0.75 | 1.024 | 1.126 | 1.23 | 1.33 | 1.43 |
| Total ash wt. percent | 0.010 | 0.0004 | Nil | Nil | Nil | Nil |
| Color, Gardner | 2 | 3 | 5 | 8 | 7 | 8 |
| pH (10 g. in 60 ml. of 10:1 isopropyl alcohol water) | 11.1 | 9.8 | 9.2 | 9.2 | 9.6 | 9.5 |

[1] AEP = Aminoethylpiperazine; PrO = Propylene oxide.

URETHANE FOAMS BASED UPON PROPYLENE OXIDE ADDUCTS

One-shot urethane foams were prepared from mixtures of oxypropylated glycerine of 3,000 molecular weight and N-aminoethylpiperazine-propylene oxide condensation product of the present invention of 3,000 molecular weight. Both of these products are triols. Foams from the glycerine-propylene oxide condensation product required 0.6% triethylenediamine (based on polyol) as catalyst whereas the foams based on the aminoethylpiperazine-propylene oxide condensation products of the present invention required less than half this amount of catalyst (i.e., 0.26% of triethylenediamine). Example III illustrates the preparation and properties of urethane foams from the aminoethylpiperazine-propylene oxide condensation product of 3,000 molecular weight.

EXAMPLE IV

Urethane foams were prepared from the aminoethylpiperazine-propylene oxide condensation product of 3,000 molecular weight (hydroxyl number 56.7) using two catalyst concentrations (0.6% and 0.26% based on polyol). The components in parts by weight used to prepare the foams were as follows:

| | 1 | 2 |
|---|---:|---:|
| AEP-PrO condensation product of 3,000 molecular weight (hydroxyl number, 56.7) | 200 | 200 |
| Water | 4.95 | 4.95 |
| Silicone oil | 1.19 | 1.19 |
| Triethylenediamine | [1] 1.19 | [2] 0.520 |
| Toluene diisocyanate (commercial products contained 80% 2,4 isomer and 20% 2,6 isomer) | 73.3 | 73.3 |

[1] 0.6% based on polyol.
[2] 0.26% based on polyol.

All of the components except the toluene diisocyanate were stirred together for one minute at 2,200 r.p.m. using a Cowles type stirrer. Toluene diisocyanate was added and stirring continued for an additional 5 to 10 seconds. The mixture was poured into a mold. After foam rise was complete, the foams were cured overnight at 73° C. Some properties of the foam are given below:

| Foam No. | Weight percent triethylenediamine [1] | Density, lb./ft.[3] | Compression set, 50% at 70° C. for 22 hrs. |
|---|---|---|---|
| 1 | 0.6 | 2.2 | 4.3 |
| 2 | 0.26 | 2.3 | 8.3 |

[1] Based on polyol.

| Foam No. | Tear resistance lb./in.[2] | Compression deflection | |
|---|---|---|---|
| | | 25% Deflection lb./in.[2] | 50% Deflection lb./in.[2] |
| 1 | 0.81 | 0.47 | 0.60 |
| 2 | 0.04 | 0.44 | 0.56 |

Urethane foams of acceptable quality cannot be prepared from 1-{2[bis(2-hydroxypropyl)amino]ethyl}-4-(2-hydroxypropyl)-piperazine alone due to the high ratio of tertiary amine groups to hydroxyl groups in the adduct. However, as was shown in Example III, stable foams can be prepared from the higher molecular weight propoxylated N-aminoethylpiperazine of the present invention.

Having described my invention, what is claimed is:

1. A method which comprises the steps of reacting a propylene oxide adduct with an organic polyisocyanate in the presence of a catalytic amount of a tertiary amine, a blowing agent and a foam stabilizing agent under conditions to provide a low density polyurethane foam, said porpylene oxide adduct having the formula:

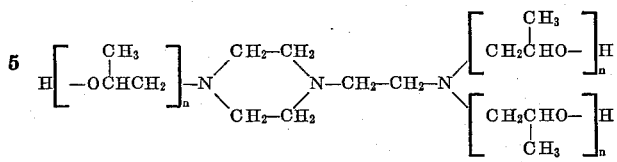

wherein $n$ is an integer within the range of about 15 to about 25.

2. A method which comprises the steps of reacting a polyol with an organic polyisocyanate in the presence of a catalytic amount of a tertiary amine, a blowing agent and a foam stabilizing agent under conditions to provide a low density, polyurethane foam, said polyol consisting of from about 5 to 100 wt. percent of a propylene oxide adduct and, correspondingly, from about 0 to about 95 wt. percent of a polyol component having an average functionality of about 3, said component having an average molecular weight of from about 1,000 to about 10,000, said proplene oxide adduct having the formula:

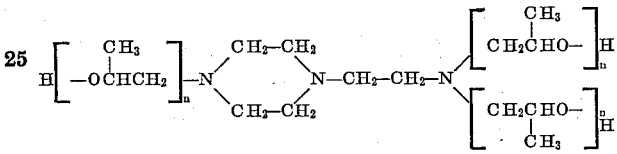

wherein $n$ is a positive integer having a value of from about 15 to about 25.

3. A polyurethane prepared by the process of claim 1.

References Cited by the Examiner
UNITED STATES PATENTS

| 2,995,530 | 8/1961 | Frisch | 260—2.5 |
| 3,075,927 | 1/1963 | Lanham | 260—2.5 |
| 3,112,281 | 11/1963 | Gromacki | 260—2.5 |

LEON J. BERCOVITZ, *Primary Examiner.*

DONALD E. CZAJA, *Examiner.*